United States Patent [19]

Takato et al.

[11] Patent Number: 4,631,366
[45] Date of Patent: Dec. 23, 1986

[54] BATTERY FEED CIRCUIT FOR SUBSCRIBER LINE

[75] Inventors: Kenji Takato, Kawasaki; Mitsutoshi Ayano, Tokyo; Kiyoshi Shibuya; Yoshimi Iijima, both of Kawasaki; Atsuo Serikawa, Yokohama, all of Japan

[73] Assignee: Fujitsu Limited, Kawasaki, Japan

[21] Appl. No.: 736,345

[22] Filed: May 21, 1985

[30] Foreign Application Priority Data

May 26, 1984 [JP] Japan .................... 59-105660
Jun. 14, 1984 [JP] Japan .................... 59-120668

[51] Int. Cl.⁴ .................................. H04M 19/00
[52] U.S. Cl. .................. 340/333; 379/324; 379/413
[58] Field of Search .......... 179/81 R, 18 FA, 16 AA, 179/16 F, 70, 77, 170 D, 170 NC

[56] References Cited

U.S. PATENT DOCUMENTS 4,525,602  6/1985  Robra et al. .............. 179/81 R X
4,567,331  1/1986  Martin ...................... 179/170 NC Primary Examiner—James L. Dwyer
Attorney, Agent, or Firm—Staas & Halsey

[57] ABSTRACT

A battery feed circuit for a subscriber line includes first and second feed circuit parts, each supplying a constant current to a corresponding subscriber line. The first and second feed circuit parts are provided with at least one of a common mode noise suppressor and a power source noise suppressor. The common mode noise suppressor includes first and second reference voltage output circuits and an intermediate voltage output circuit to produce the voltage between the first and second subscriber lines and superpose the same onto the first and second reference voltages. The power source noise suppressor functions to cancel the power source noise voltage at the output, of the first and second feed circuit parts.

14 Claims, 16 Drawing Figures

4,631,366

BATTERY FEED CIRCUIT FOR SUBSCRIBER LINE

BACKGROUND OF THE INVENTION (1) Field of the Invention

The present invention relates to a battery feed circuit, more particularly, to a battery feed circuit used as a constant-current battery feed circuit for subscriber lines in a switching system.

(2) Description of the Related Art

As well known, battery feed circuits play an important role in feeding a constant DC current, via subscriber lines, to telephone sets, data terminals, and other subscriber units. Battery feed circuits are thus some of the most important parts in a switching system. Recently, the need has been growing for switching network featuring increased quality of transmission signals, decreased power consumption, reduced systems costs, and so on. The need is being met by improvements in hardware, including battery feed circuits.

There are several types of battery feed circuits, e.g., a "constant-resistor" type and a "constant-current" type. Constant-resistor types are undesirable from the viewpoint of power consumption. Constant-current types feature lower power consumption, but suffer from the problem of instability and undesired clipping of transmission signals due to common mode noise induced along the subscriber lines.

SUMMARY OF THE INVENTION

An object of the present invention is to provide an improved battery feed circuit installed in a line circuit for a subscriber line in a switching system, which will work to feed DC current as usual and further suppress noise in the transmission signals.

To attain the above object, the battery feed circuit according to the present invention incorporates special means for balancing voltage differences in a subscriber line pair.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
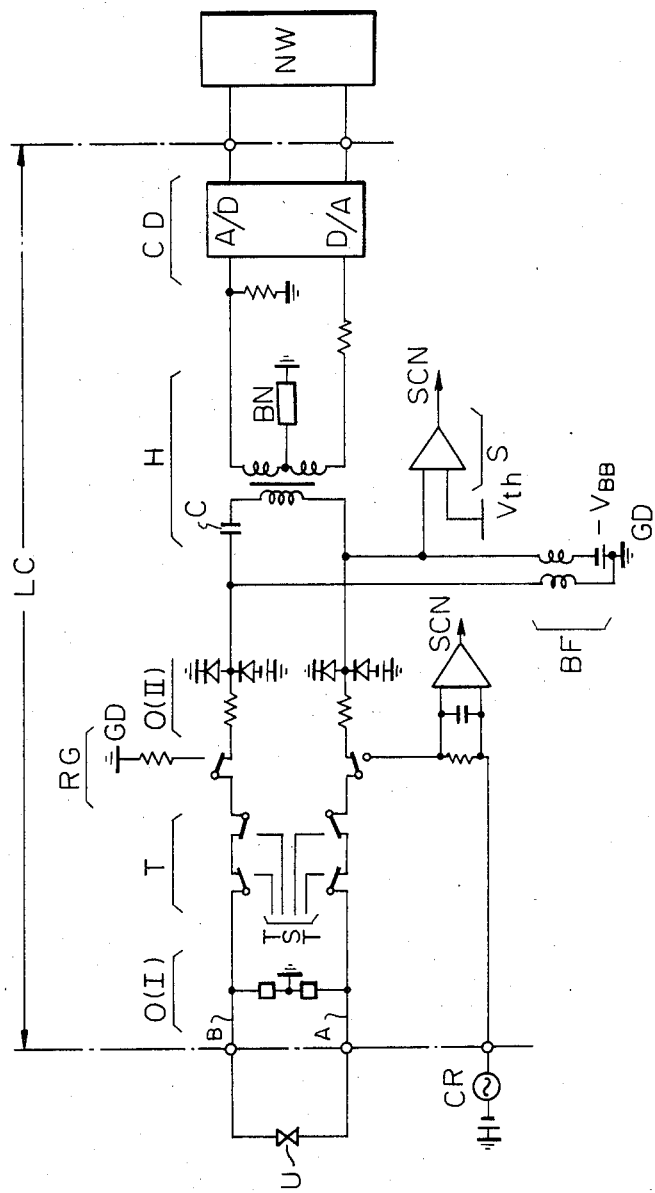
FIG. 1 is a general circuit diagram of an example of a conventional subscriber line in, for example, a digital switching system.

Before describing the embodiments of the present invention, the prior art and problems therein will be described with reference to the related figures. FIG. 1 is a general circuit diagram of an example of a conventional subscriber line in, for example, a digital switching system. In FIG. 1, reference characters "BF" represent a battery feed circuit to which the present invention specifically refers. A high-voltage protector "O" (in the drawings, a primary protector O(I) and a secondary protector O(II) are illustrated) is used for protecting the line circuit LC from a high voltage surge such as lightning. A ringing circuit "RG" sends ringing signals from a continuous ringer CR to a subscriber unit U (in the drawing, U is a telephone set) which is connected, via subscriber lines A and B, with the circuit LC.

The transmission signal to and from the subscriber unit U is transferred by way of a hybrid transformer H for performing conversion between a two-wire line provided with a DC-cut capacitor C and a four-wire line provided with a balancing network BN. The hybrid transformer H is connected, via a codec (coder-decoder) CD comprised of both an analog/digital (A/D) converter and a digital/analog (D/A) converter, to a digital switching network NW. The codec CD works to effect conversions between a voice signal and a pulse code modulation (PCM) signal. The continuous ringer CR cooperates with a scanner SCN. The scanner SCN is also connected with a supervisory circuit S. Reference character T denotes a test circuit connected with test configuration lines TST.

As seen from FIG. 1, the battery feed circuit BF is connected with the subscriber lines A and B and supplies DC current thereto during an off-hook state. During this state, the battery feed circuit BF provides a high impedance to prevent attenuation of the AC transmission signals, e.g., voice signals.

Figure 2A:
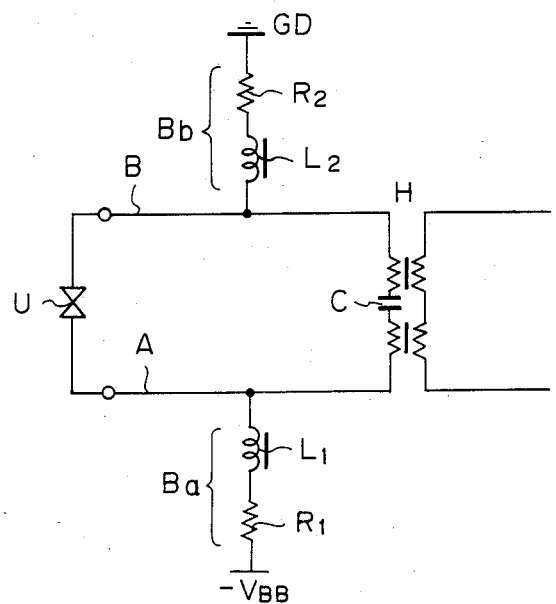
FIG. 2(a) is a circuit diagram of a conventional constant-resistor type battery feed circuit.
Figure 2B:
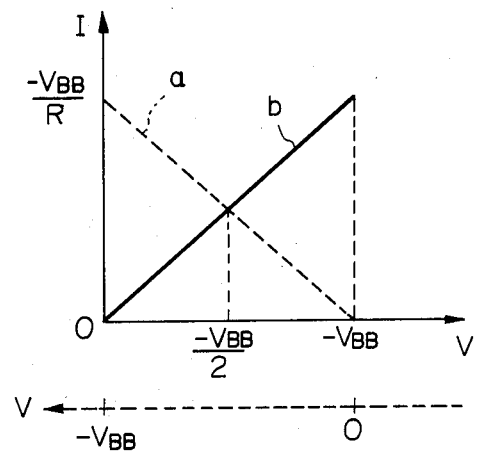
FIG. 2(b) is a graph depicting DC voltage-current characteristics of the subscriber lines A and B.

FIG. 2(a) is a circuit diagram of a conventional constant-resistor type feed circuit, and FIG. 2(b) is a graph depicting DC voltage-current characteristics of the subscriber line A and B. In FIG. 2(a) the subscriber line A and a power source of $-V_{BB}$ are connected via the series-connected resistor $R_1$ and inductance $L_1$, while the subscriber line B and ground GD are connected via the series-connected resistor $R_2$ and inductance $L_2$. The members $R_1$ and $L_1$ form a battery feed circuit $B_a$, and the members $R_2$ and $L_2$ form a battery feed circuit $B_b$. The inductances $L_1$ and $L_2$ represent respective coils for feeding DC current. Their resistance components are represented by the resistor $R_1$ and $R_2$, respectively. Since each of the coils $L_1$ and $L_2$ provides a sufficiently large inductance for frequencies higher than 300 Hz in the voice signals, a high impedance state can be achieved. The coils exhibit a low impedance against a DC current, defined by the resistors $R_1$ and $R_2$. Thus, the battery feeding current I is stabilized, as shown in FIG. 2(b), wherein line b represents a voltage-current characteristic regarding the subscriber line B and line a represents the same regarding the subscriber line A. The intermediate voltage between the subscriber lines A and B is held at $-V_{BB}/2$ during the off-hook state of the subscriber unit U (telephone set), wherein a closed loop is formed by way of the lines A and B.

According to the constant-resistor type battery feed circuit shown in FIG. 2(a), a DC current of 100 mA or more is necessarily given to the subscriber lines A and B, especially when the lines are short in length. Therefore, a battery feed circuit of such type is not economical due to the large size of the coils. Also, there is a problem of heat generated by the relatively large electrical power.

Figure 3A:
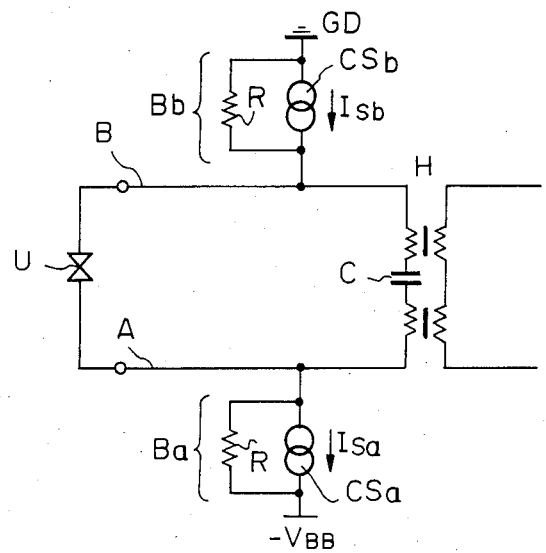
FIG. 3(a) is a circuit diagram of a conventional constant-current type battery feed circuit.
Figure 3B:
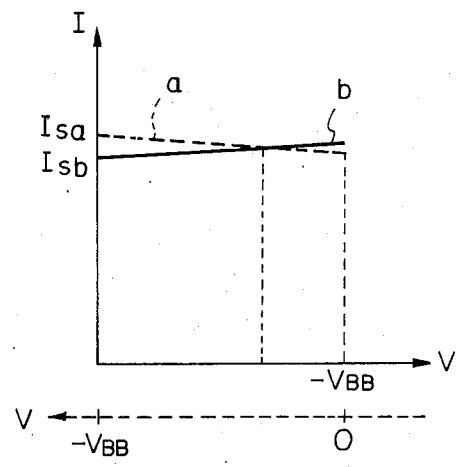
FIG. 3(b) is a graph depicting DC voltage-current characteristics of the subscriber lines A and B.

FIG. 3(a) is a circuit diagram of a conventional constant-current type battery feed circuit, and FIG. 3(b) is a graph depicting DC voltage-current characteristics of the subscriber lines A and B. The constant-current type battery feed circuit having the parts $B_a$ and $B_b$ represents an improvement over the battery feed circuit of FIG. 2(a) in terms of power consumption. In FIG. 3(a), the line A and line B feed circuit parts $B_a$ and $B_b$ are basically constructed by pairs of resistors (R) and constant-current sources (CS), i.e., ($R_a$, $CS_a$) and ($R_b$, $CS_b$), respectively. The resistor (R) and the constant-current source (CS) are connected in parallel.

According to the constant-current type battery feed circuit shown in FIG. 3(a), since the related battery feed circuit has a high impedance, voice signals are attenuated slightly thereby. Further, a constant DC current can always be ensured regardless of the length of the subscriber lines A and B. Therefore, the intended low power consumption can be attained.

However, as previously mentioned, undesired clipping of the transmission signals takes place. This will be explained with reference primarily to the voltage-current characteristics shown in FIG. 3(b). As understood from FIG. 3(b), during the off-hook state of the related subscriber unit (telephone), the intermediate voltage between the subscriber lines A and B cannot always be set at $-V_{BB}/2$ due to an imbalance between the constant currents $I_{sa}$ and $I_{sb}$ and/or an imbalance between the resistors R of the line A and line B side feed circuit parts $B_a$ and $B_b$. The voltages of the subscriber lines A and B should be within the range of $-V_{BB}$ through $-V_{BB}/2$ and the range of $-V_{BB}/2$ through the ground level. However, in the worst case, the voltages of the lines A and B shift too far to $-V_{BB}$ and the ground level, respectively. Such extreme shifts in the line voltage cause saturation in the related transistors and thereby cause the problem of clipping in the transmission signals.

In the above case, even if two constant-current sources have exactly the same voltage-current characteristics, undesired clipping is very likely to take place due to external noise on the lines A and B, in the form of common mode noise. This is because, when such common mode noise is present on lines A and B, the constant currents $I_{sa}$ and $I_{sb}$ become unbalanced with each other. Therefore, the intermediate voltage concerned deviates from the normal voltage of $-V_{BB}/2$.

Figure 4:
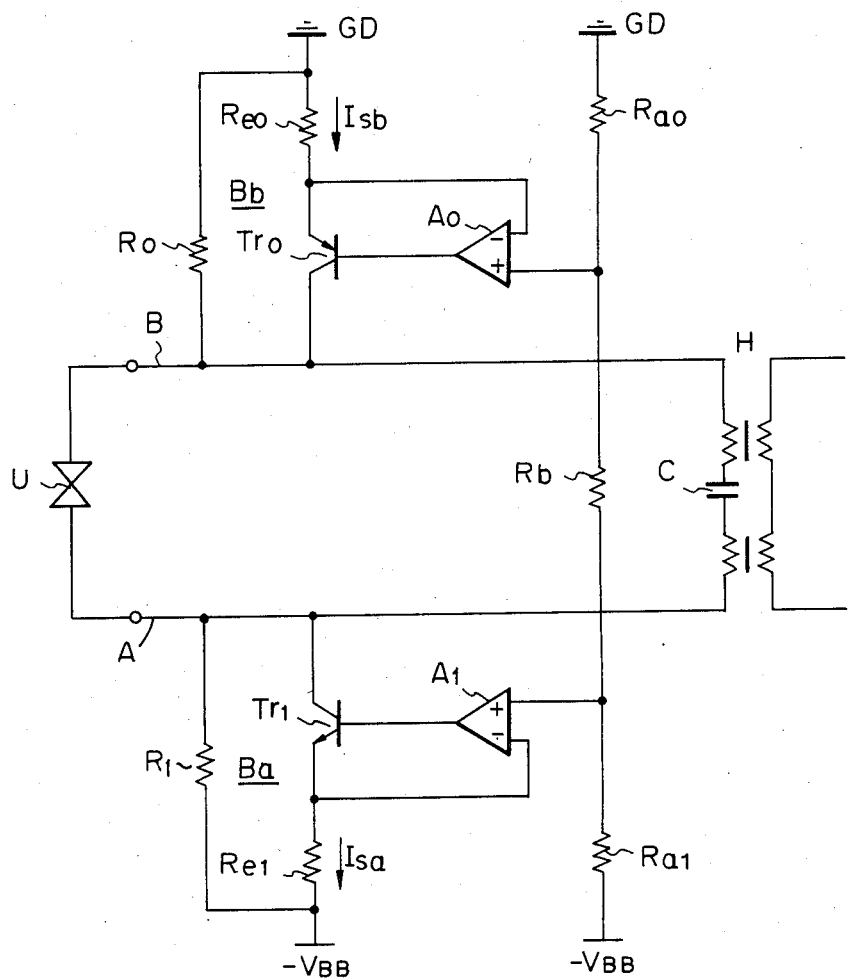
FIG. 4 is a more detailed circuit diagram of the battery feed circuit illustrated in FIG. 3(a)

FIG. 4 is a more detailed circuit diagram of the battery feed circuit shown in FIG. 3(a). In FIG. 4, reference characters $A_0$ and $A_1$ denote operational amplifiers (hereinafter abbreviated as OP-AMP) and $T_{r0}$ and $T_{r1}$ denote transistors. Resistors $R_{a0}$, $R_b$, and $R_{a1}$ divide the voltage across the ground GD (OV) and the power source level ($-V_{BB}$). The voltages across the resistors $R_{a0}$ and $R_{a1}$ are applied, as respective reference voltages, to the non-inverting input terminals (+) of the OP-AMP's $A_0$ and $A_1$, respectively. Therefore, the OP-AMP's operate to make the voltages across the resistors $R_{e0}$ and $R_{e1}$ equal, respectively, to the voltages across the resistors $R_{a0}$ and $R_{a1}$. In this case, the constant currents $I_{sa}$ and $I_{sb}$ flow through the respective resistors $R_{e0}$ and $R_{e1}$, which constant currents are defined as follows:

$$I_{sb} = \left( V_{BB} \times \frac{R_{a0}}{R_{a0} + R_b + R_{a1}} \right) / R_{e0}$$

$$I_{sa} = \left( V_{BB} \times \frac{R_{a1}}{R_{a0} + R_b + R_{a1}} \right) / R_{e1}$$

Assuming here that the current amplification factor $h_{FE}$ of transistors $T_{r0}$ and $T_{r1}$ satisfies $h_{FE} >> 1$, the constant current $I_{sb}$ along the resistor $R_{e0}$ becomes substantially the same as the current flowing across the transistor $T_{r0}$. Similarly, the current $I_{sa}$ becomes the current flowing across the transistor $T_{r1}$. If the equations $I_{sb} = I_{sa}$ and $R_0 = R_1$ stand strictly, the intermediate voltage between the subscriber lines A and B should theoretically assume the voltage $-V_{BB}/2$. In actuality, however, the constant currents $I_{sa}$ and $I_{sb}$ cannot be exactly the same. Accordingly, the voltages of the subscriber lines A and B shift too far to $-V_{BB}$ or the ground level of 0 V, as mentioned previously. In order to prevent such a shift in voltage toward $-V_{BB}$ and 0 V, resistors $R_0$ and $R_1$ are added to the feed circuit parts $B_b$ and $B_a$, respectively. The resistors $R_0$ and $R_1$ work to compensate for the imbalance between the currents $I_{sb}$ and $I_{sa}$. The resistors $R_0$ and $R_1$ preferably have neither too high nor too low resistance values. If the resistance values of the resistors $R_0$ and $R_1$ are too low, the constant-current characteristics are deteriorated and the transmission signal is attenuated thereby. Conversely, if they are too high, the constant-current characteristics are kept normal, but the intermediate voltage between the subscriber lines A and B is very likely to deviate from $-V_{BB}/2$.

Further, when common mode noise is present on subscriber lines A and B, common mode noise voltages appear on these lines A and B. The voltage amplitudes are proportional to the impedances of the feed circuit parts $B_b$ and $B_a$. The noise voltages destroy the balance between the two feed circuit parts. Thus, the aforesaid clipping takes place in the transmission signal or, in some case, the transmission signal is stopped from propagating.

In view of the above-mentioned problems, the present invention proposes a battery feed circuit which features, first, low power consumption with normal constant-current characteristics, second, superior noise suppression against common mode noise and/or power source noise, and, third, prevention of undesired clipping in the transmission signals through the subscriber lines A and B.

Figure 5:
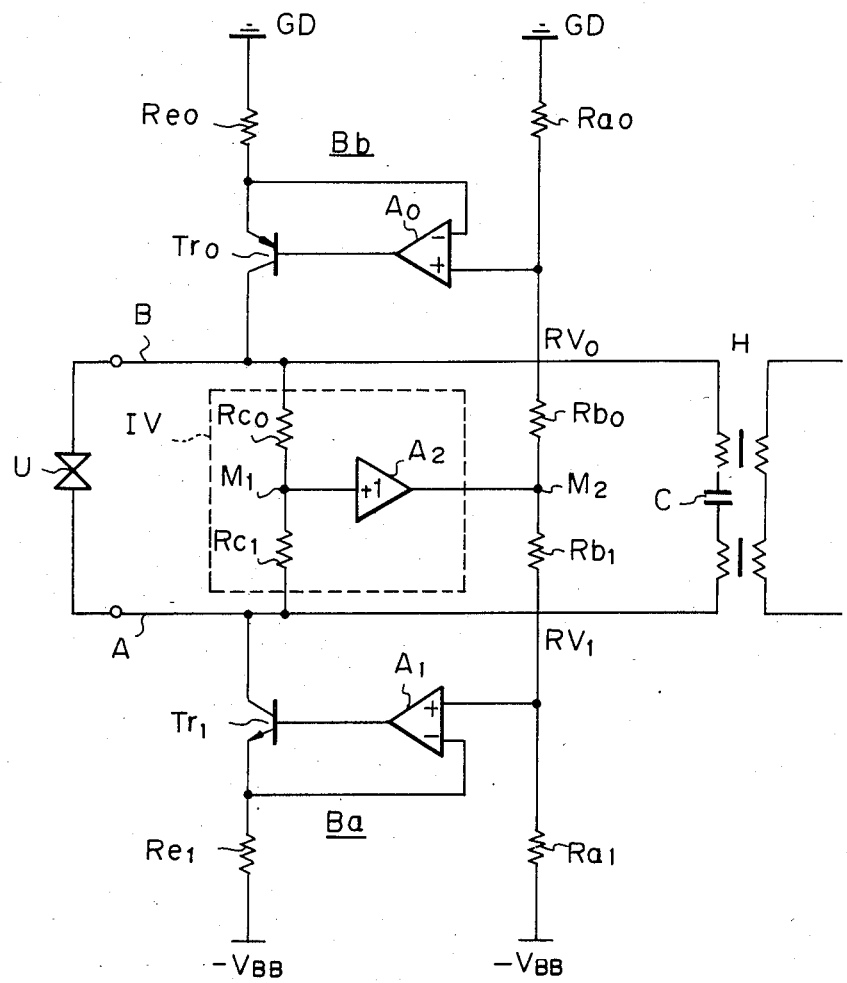
FIG. 5 is a circuit diagram of a battery feed circuit for a subscriber line according to a first embodiment of the present invention.

FIG. 5 is a circuit diagram of a battery feed circuit for a subscriber line according to a first embodiment of the present invention. The differences here relative to the prior art construction shown in FIG. 4 are as follows. First, an intermediate voltage output circuit IV is newly employed. Second, a first reference voltage output circuit $RV_0$ and a second reference voltage output circuit $RV_1$ are newly employed, the related resistors $R_{b0}$ and $R_{b1}$ being equivalent to two identical resistors obtained by dividing $R_b$ shown in FIG. 4. The resistors $R_{a0}$, $R_{b0}$ and $R_{a1}$, $R_{b1}$ determine first and second reference voltages obtained by dividing the voltage between the ground level (GD) and the power source level ($-V_{BB}$), in which the following equations are satisfied: $R_{a0}=R_{a1}$ and $R_{b0}=R_{b1}$.

The intermediate voltage output circuit IV operates to produce an intermediate voltage between the first and second subscriber lines A and B. The output circuit IV is comprised of resistors $R_{c0}$ and $R_{c1}$ ($R_{c0}=R_{c1}$) connected in series and an amplifier $A_2$. The input of the amplifier $A_2$ is connected to an intermediate connecting point $M_1$ of the resistors $R_{c0}$ and $R_{c1}$, while the output of the amplifier $A_2$ is connected to an intermediate connecting point $M_2$ of the resistors $R_{b0}$ and $R_{b1}$.

The amplifier $A_2$ is constructed as a voltage follower of gain 1 and is operative to feed the intermediate voltage at the point $M_1$ back to the intermediate point $M_2$. In this case, usual transmission signals do not appear at the point $M_1$ since they form so-called differential mode signals between the lines A and B. Only the common mode transmission signals appear at the point $M_1$. The common mode signals at the output of the amplifier $A_2$ are applied to each non-inverting input terminal of the OP-AMP's $A_0$ and $A_1$. Due to the inherent functions of the OP-AMP's $A_0$ and $A_1$, the common mode signals appear at each inverting input terminal ($-$) of the OP-AMP's $A_0$ and $A_1$. The common mode signals are then inverted by the transistors $T_{r0}$ and $T_{r1}$, whereby the subscriber lines A and B are supplied with signals of opposite phases relative to the aforesaid common mode signals. Accordingly, the impedances of the first feed circuit part $B_b$ and second feed circuit part $B_a$, in terms of the common mode signals, are reduced from infinity ($\infty$) to $$\frac{(R_{a0} + R_{b0}) \times R_{e0}}{R_{a0}} \text{ and}$$

$$\frac{(R_{a1} + R_{b1}) \times R_{e1}}{R_{a1}}, \text{ respectively.}$$

Due to the reduction of the impedances, the common mode noise is cancelled by the feed circuit parts $B_b$ and $B_a$. Therefore, the noise suppression capability for common mode noise is improved by the battery feed circuit of FIG. 5.

Further, deviation of the intermediate voltage between the lines A and B due to an imbalance between the feed circuit parts $B_b$ and $B_a$ can be detected in the form of common mode deviation between the lines A and B. Thus, the intermediate voltage can be stabilized at a level close to $-V_{BB}/2$ by the reduced impedances mentioned above. This makes it possible to eliminate the resistors $R_0$ and $R_1$ from the prior art circuit of FIG. 4.

As a result, a battery feed circuit for a subscriber line can be realized which features low impedance with respect to common mode signals, while maintaining the inherent constant-current source structure and low power consumption.

The first embodiment can be further improved. As seen from FIG. 5, the constant current concerned is determined merely by dividing the voltage between the ground (GD) level and the power source level $-V_{BB}$. Accordingly, if a noise voltage $V_N$ is induced in the power source, the non-inverting input terminals of the OP-AMP's $A_1$ and $A_0$ are, respectively, supplied with the voltages $V_{+1}$ and $V_{+0}$, which are expressed as follows:

$$V_{+1} = \frac{R_{a0} + R_{b0} + R_{b1}}{R_{a0} + R_{b0} + R_{b1} + R_{a1}} \times V_N$$

$$V_{+0} = \frac{R_{a0}}{R_{a0} + R_{b0} + R_{b1} + R_{a1}} \times V_N$$

Consequently, the subscriber lines A and B are supplied with noise signals different from each other, which results in differential noise in the subscriber unit U.

Figure 6:
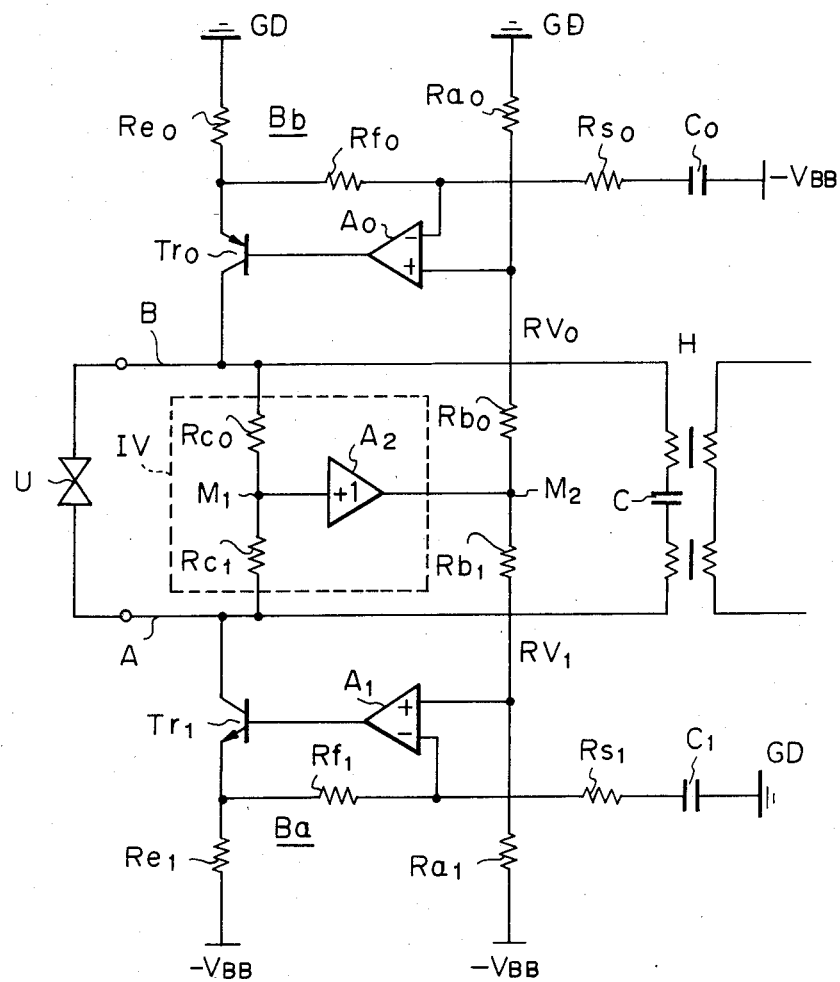
FIG. 6 is a circuit diagram of a battery feed circuit for a subscriber line according to a second embodiment of the present invention.

FIG. 6 is a circuit diagram of a battery feed circuit for a subscriber line according to a second embodiment of the present invention. The second embodiment improves the first embodiment with regard to the differential noise. The second embodiment differs from the construction of FIG. 5 in the provision of the following: a resistor $R_{f0}$ connected between the emitter of the transistor $T_{r0}$ and the inverting input terminal ($-$) of the OP-AMP $A_0$; a resistor $R_{s0}$ and a DC-cut capacitor $C_0$ connected in series between the power source ($-V_{BB}$) and the inverting input terminal ($-$) of the OP-AMP $A_0$; a resistor $R_{f1}$ connected between the emitter of the transistor $T_{r1}$ and the inverting input terminal ($-$) of the OP-AMP $A_1$; and a resistor $R_{s1}$ and a DC-cut capacitor $C_1$ connected in series between ground GD and the inverting input terminal ($-$) of the OP-AMP $A_1$. In FIG. 6, the values of the resistors $R_{f0}$, $R_{s0}$, $R_{f1}$, and $R_{s1}$ are selected to satisfy the following equations:

$$\frac{R_{f0}}{R_{s0}} = \frac{R_{a0}}{R_{a0} + 2 \times R_{b0}} \text{ and}$$

$$\frac{R_{f1}}{R_{s1}} = \frac{R_{a1}}{R_{a1} + 2 = R_{b1}}.$$

Also, the values of the capacitors $C_0$ and $C_1$ are selected to be negligible impedances in terms of AC. Under these conditions, the non-inverting input terminal (+) of the OP-AMP $A_1$ is supplied with a voltage $V_{+1}$, due to the noise voltage $V_N$, expressed as $$V_{+1} = \frac{R_{a0} + R_{b0} + R_{b1}}{R_{a0} + R_{b0} + R_{b1} + R_{a1}} \times V_N$$

Here, if the resistance values are predetermined so that $R_{a0}=R_{a1}$ and $R_{b0}=R_{b1}$, the above noise voltage $V_{+1}$ can be rewritten as:

$$V_{+1} = \frac{R_{s1}}{R_{f1} + R_{s1}} \times V_N$$

On the other hand, the voltage $V_{-1}$ at the noninverting input terminal of the OP-AMP $A_1$ assumes the following value due to the noise voltage $V_N$:

$$V_{-1} = \frac{R_{s1}}{R_{f1} + R_{s1}} \times V_N$$

As a result, an equation $V_{+1} = V_{-1}$ stands, which means that no signal caused by power source noise appears at the output terminal of the OP-AMP $A_1$. This holds true for the OP-AMP $A_0$ as well. Therefore, $V_{+0} = V_{-0}$ stands. This means that no signal caused by power source noise appears at the output terminal of OP-AMP $A_0$.

As understood from the above, the battery feed circuit according the second embodiment is advantageous in that, even if power source noise is induced, differential noise resulting therefrom does not appear in the subscriber lines A and B. The second embodiment can be further improved, however. In FIG. 6, the OP-AMP's $A_0$ and $A_1$ continuously attempt to feed the constant currents even when the subscriber unit U is in an on-hook state, i.e., even when no loop current is needed. This is because the non-inverting input terminals of the OP-AMP's $A_0$ and $A_1$ are continuously supplied with voltages divided by the related resistors between the ground GD and the power source ($-V_{BB}$). Therefore, the transistors $T_{r0}$ and $T_{r1}$ do not pass any current and accordingly, no voltage drop is induced across the resistors $R_{e0}$ and $R_{e1}$. Accordingly, the 0 V level and $-V_{BB}$ level are supplied to the inverting input terminals (−) of the OP-AMP's $A_0$ and $A_1$, respectively, which levels are not equal to the respective voltage $V_{+0}$ and $V_{-1}$ appearing at the non-inverting input terminals. The OP-AMP's thus function as comparators, the OP-AMP $A_0$ reducing its output voltage to the power source level $-V_{BB}$. Thus, a constant current, the same as that flowing during an off-hook state, flows along the path of resistor $R_{e0} \rightarrow$ transistor $T_{r0} \rightarrow$ OP-AMP $A_0$. Alternatively, the OP-AMP $A_0$ pulls as large a current, at its output terminal, as possible.

The above fact also applies to the OP-AMP $A_1$. Therefore, its output voltage increases as high as possible. Thus, a constant current, identical to that mentioned above, flows. Alternatively, it pulls a current at its output terminal as large as possible.

Figure 7:
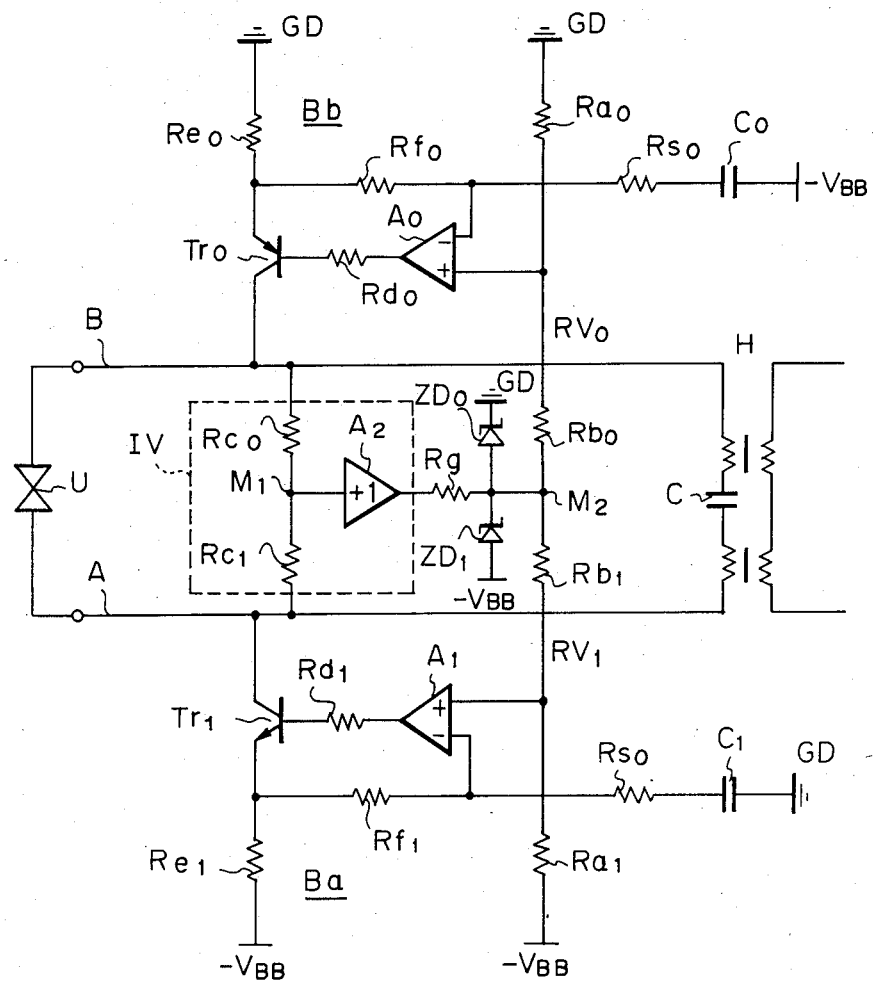
FIG. 7 is a circuit diagram of a battery feed circuit for a subscriber line according to a third embodiment of the present invention.

FIG. 7 is a circuit diagram of a battery feed circuit for a subscriber line according to a third embodiment of the present invention. The problem with the second embodiment of the uneconomical flow of current is improved. The difference relative to the construction of FIG. 6 lies in the provision of a resistor $R_{d0}$ for limiting current connected between the output terminal of the OP-AMP $A_0$ and the base of the transistor $T_{r0}$, a zener diode $ZD_0$ connected between the ground GD and the intermediate connecting point $M_2$, a resistor $R_{d1}$ for limiting current connected between the output terminal of the OP-AMP $A_1$ and the base of the transistor $T_{r1}$, a zener diode $ZD_1$ connected between the power source ($-V_{BB}$) and the intermediate connecting point $M_2$, and a resistor $R_g$ connected between the point $M_2$ and the output terminal of the OP-AMP $A_2$.

The current during the on-hook state can be limited by the resistors $R_{d0}$ and $R_{d1}$. Accordingly, a low power consumption is attained. The resistors are selected to have a maximum resistance value in a range wherein sufficient base currents for the transistors $T_{r0}$ and $T_{r1}$ can be maintained during an off-hook state.

The resistor $R_g$ and the zener diodes $ZD_0$ and $ZD_1$ are useful for emergencies such as ground-faults along the subscriber lines A and/or B or a faulty contact. For example, when a ground-fault takes place along the subscriber line A while the subscriber line B is left open, the voltage at the intermediate connecting point $M_1$ becomes the ground (GD) level and the output of the OP-AMP $A_2$ changes to the ground (GD) level. As a result, the voltage level at the intermediate connecting point $M_1$ relative to the potential $-V_{BB}$ increases to twice the voltage normally obtained, and the constant current supplied by the feed circuit part $B_a$ increases two times the normal predetermined current. Accordingly, the power consumption increases to four times the power normally consumed, necessitating reconsideration of heat design. The resistor $R_g$ and the zener diodes $ZD_0$ and $ZD_1$ are useful for clamping a current flowing through the transistor $T_{r1}$ to a certain magnitude, e.g., 1.4 times, thereby limiting the related increase in power consumption to two times ($1.4 \times 1.4 = 1.96$) at most.

Incidentally, the amplifier $A_2$ in each embodiment is not limited to a gain of 1 and may have a gain of over 1. If the gain G is higher than 1, the impedance in terms of the common mode noise induced in the subscriber lines A and B can advantageously be reduced by 1/G. On the other hand, however, such an amplifier $A_2$ of a gain G (G>1) cannot simply be fabricated, because a usual voltage follower cannot be used. Instead, a special non-inversion circuit is needed.

Referring again to the second and third embodiments shown in FIGS. 6 and 7, these embodiments not only suppress undesired common mode noise, but also deleterious power source noise ($V_N$). There is, however, room for improvement is these embodiments in the sense of cost.

Figure 8:
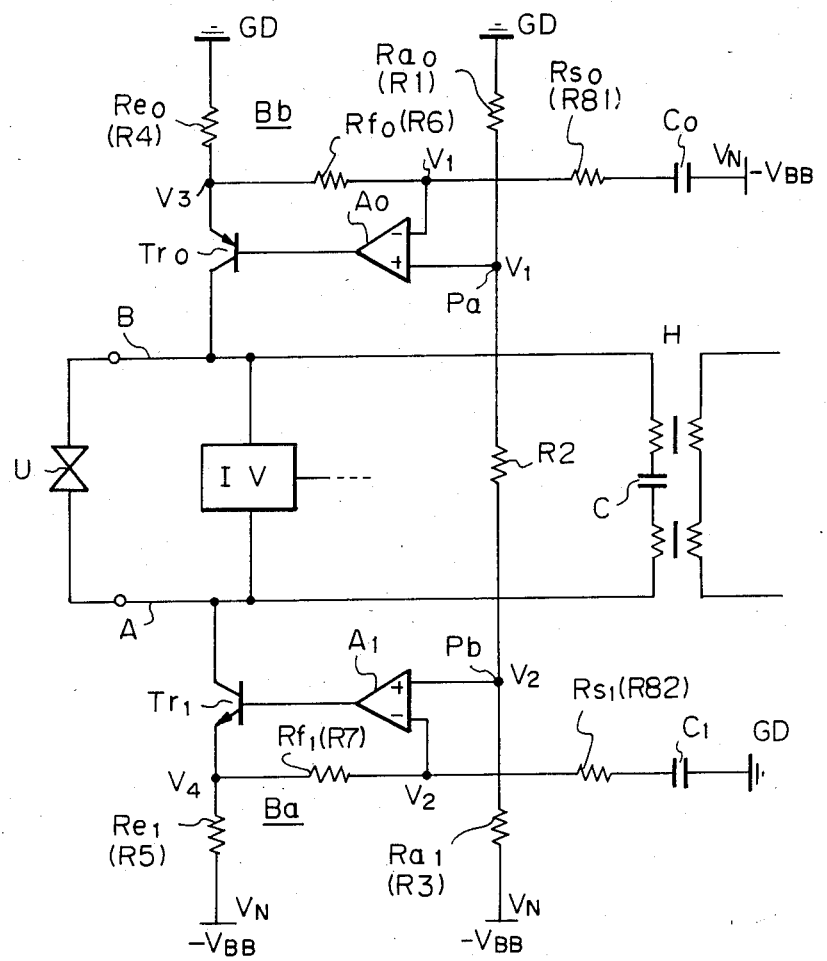
FIG. 8 is a circuit diagram used for explaining a fourth embodiment in principle.

FIG. 8 is a circuit diagram for explaining a fourth embodiment in principle. The construction of FIG. 8 is substantially the same as FIGS. 6 and 7. The intermediate voltage output circuit IV is illustrated simply as a circuit block. The resistors $R_{b0}$ and $R_{b1}$ (including the zener diodes $ZD_0$ and $ZD_1$) are replaced by a single resistor having a resistance value of $R_2$. Characters $R_1$ through $R_7$, $R_{81}$, and $R_{82}$ in parentheses denote respective resistance values. Furthermore, characters $P_a$ and $P_b$, and $V_1$ through $V_4$ are introduced for easy comprehension in relation to FIG. 9.

Figure 9:
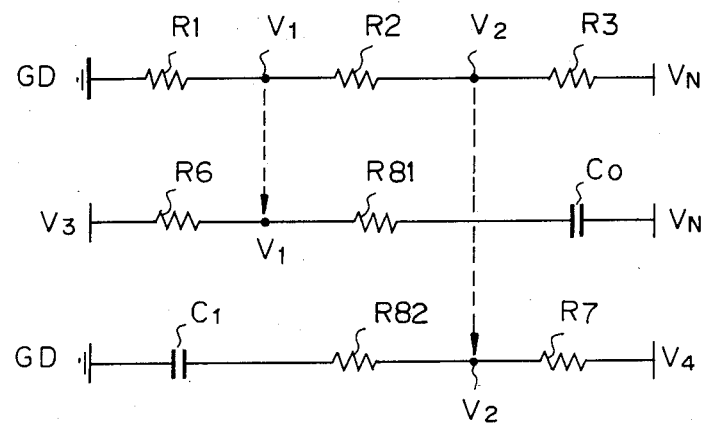
FIG. 9 is a diagram depicting voltages appearing at major portions in FIG. 8.

FIG. 9 depicts voltages appearing at major portions in FIG. 8. In FIG. 9, first, the voltage $V_3$ is preset as 0V and the voltage $V_4$ is preset as a level equal to the power source noise voltage $V_N$ in order that the condition be satisfied that the voltage across the resistor of $R_4$ and the voltage across the resistor of $R_5$ be made equal to 0V. This is required for the following reason. The voltages appearing at the points $P_a$ and $P_b$ are defined as $V_1$ and $V_2$, expressed below:

$$V_1 = \{R1/(R1+R2+R3)\} \times V_N$$

$$V_2 = \{(R1+R2)/(R1+R2+R3)\} \times V_N$$

Thus, the voltages $V_1$ and $V_2$ are applied to the non-inverting input terminals (+) of the OP-AMP's $A_0$ and $A_1$, respectively. Then, identical voltages ($V_1$ and $V_2$) appear at their inverting input terminals (−) due to the well-known phenomenon of "imaginary short-circuits"

inherent to an operational amplifier. Therefore, noise currents $i_{n1}$ and $i_{n2}$ caused by the power source noise voltage $V_N$ flow through the resistors of R4 and R5, respectively. The noise currents $i_{n1}$ and $i_{n2}$ are expressed as:

$$i_{n1} = (V_1 - 0)/R4$$
$$= \{R1/(R1 + R2 + R3)\} \times V_N/R4$$
$$i_{n2} = (V_n - V_2)/R5$$
$$= V_N/R5 - \{(R1 + R2)/(R1 + R2 + R3)\} \times V_N/R5$$

Where, "0" denotes the ground (GD) level. The noise currents $i_{n1}$ and $i_{n2}$ cannot flow if no voltage is generated across each of the resistors (R4 and R5) by the power source noise voltage $V_N$. This results in the aforesaid condition and, at the same time, is another way for proving the power source noise can be suppressed.

Returning again to FIG. 9, the voltages $V_1$ and $V_2$ at the non-inverting input terminals (+) of the OP-AMP's $A_0$ and $A_1$ appear also at the inverting input terminals (−). Thus is due to the aforesaid "imaginary short-circuits" and is schematically indicated with broken line arrows in FIG. 9, i.e., $V_1 \rightarrow V_1$ and $V_2 \rightarrow V_2$. Under this condition, the voltage diagrams shown by FIG. 9 stand if the following proportional equations are satisfied.

$$R1:(R2+R3)=R6:R81$$

$$R3:(R2+R1)=R7:R82$$

Conversely, if the resistance values R6, R81, R7, and R82 are selected to satisfy the above-recited two proportional equations, the related equations $V_3=0$ and $V_4=V_N$ can be satisfied. Accordingly, since no voltage drops are generated across each of the resistors R4 and R5, there are no noise currents $i_{n1}$ and $i_{n2}$. This means the power source noise can no longer travel to the subscriber unit.

As apparent from FIGS. 6 and 7, the number of the resistors and capacitors is relatively large compared with the first embodiment of FIG. 5. From this viewpoint, the battery feed circuit according to the second and third embodiments can be improved in view of cost. Even a single reduction in the resistors and capacitors is beneficial for a switching system from an economical viewpoint, because battery feed circuits are allotted for every subscriber unit. If k subscribers are accommodated in the related switching system, up to k resistors and k capacitors, can be saved. Accordingly, the manufacturing cost may be reduced.

Figure 10:
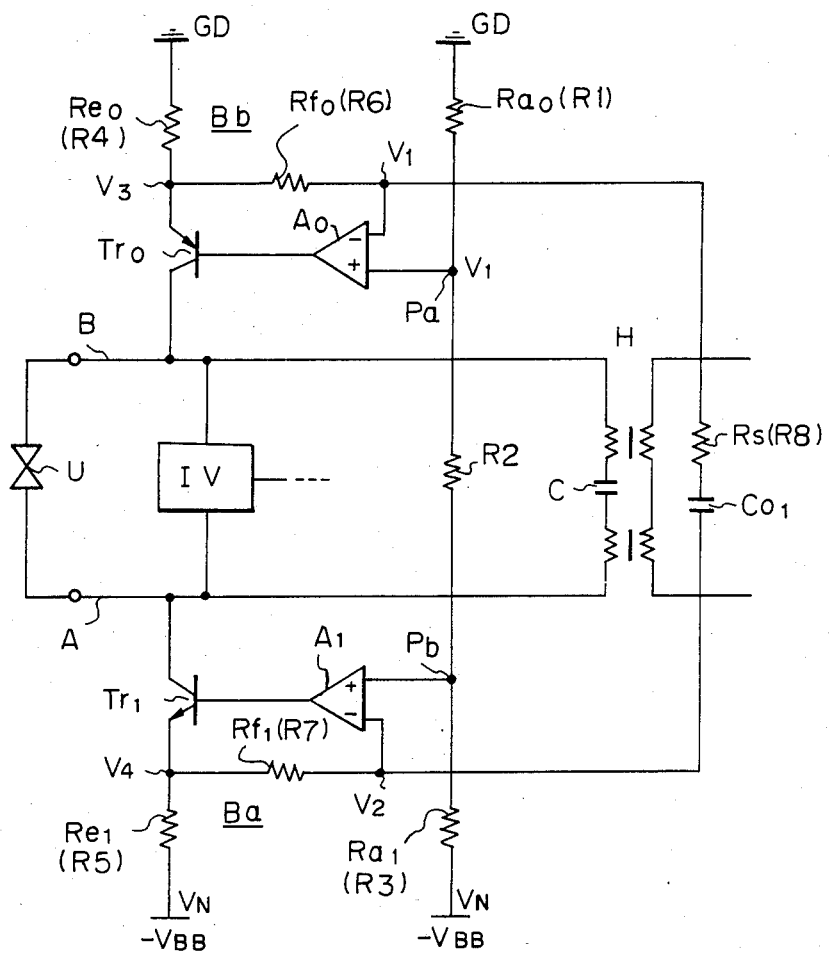
FIG. 10 is a circuit diagram of a battery feed circuit according to the fourth embodiment of the present invention.

FIG. 10 is a circuit diagram of a battery feed circuit according to the fourth embodiment of the present invention. In the fourth embodiment, the inverting input terminals (−) of the OP-AMP's $A_0$ and $A_1$ are connected to each other via a resistor $R_S$ (resistance value of R8) and a capacitor $C_{01}$ connected in series. As clear from FIG. 10, two electrical components are reduced compared with FIG. 8. Specifically, the four electrical components $R_{S0}(R81)$, $R_{S1}(R82)$, $C_0$, and $C_1$ comprising the battery feed circuit of FIG. 8 are replaced in FIG. 10 by two electrical components $R_S(R8)$ and $C_{01}$. This replacement may be made due to the following:

The voltages $V_1$ and $V_2$, appearing at the points $P_a$ and $P_b$ in FIG. 10, are expressed by the previously recited equations, i.e.:

$$V_1 = \{R1/(R1+R2+R3)\} \times V_N$$

$$V_2 = \{(R1+R2)/(R1+R2+R3)\} \times V_N$$

Voltages identical to $V_1$ and $V_2$ also appear, due to "imaginary short-circuits", at the inverting input terminals of the OP-AMP's $A_0$ and $A_1$. This being so, the aforesaid noise currents $i_{n1}$ and $i_{n2}$ flow through resistors of R4 and R5, respectively. In order to make these noise currents substantially zero, the voltages $V_3$ and $V_4$ are, preset respectively, to be 0V and $V_N$, as mentioned before.

Figure 11:
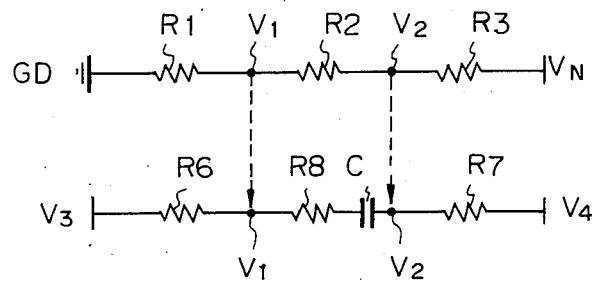
FIG. 11 is a diagram depicting voltages appearing at major portions in FIG. 10.

FIG. 11 contains diagrams depicting voltages appearing at major portions in FIG. 10. The method for reading the diagrams is similar to that for FIG. 9. The difference with FIG. 9 is that the voltages $V_1$ and $V_2$ (refer to $GD-V_N$ in upper row of FIG. 9) are not used independently, as depicted in the middle row ($V_3-V_N$) and in lower row ($GD-V_4$) of FIG. 9, but are commonly used, as depicted by $V_3-V_4$ in the lower row of FIG. 11. According to the voltage diagrams of FIG. 11, the intended conditions, i.e., $V_3=0(GD)$ and $V_4=V_N$, can be satisfied by the following proportional equations:

$$R1:R2=R6:R8$$

$$R3:R2=R7:R8$$

These are rewritten as follows:

$$R1:R2:R3:=R6:R8:R7 \text{ or}$$

$$R1/R6=R2/R8=R3/R7.$$

If the resistance values R6, R7 and R8 are determined to satisfy either one of these two proportional equations, the conditions $V_3=0$ and $V_4=V_N$ can be satisfied. As a result, the noise currents $i_{n1}$ and $i_{n2}$ can be suppressed.

Figure 12:
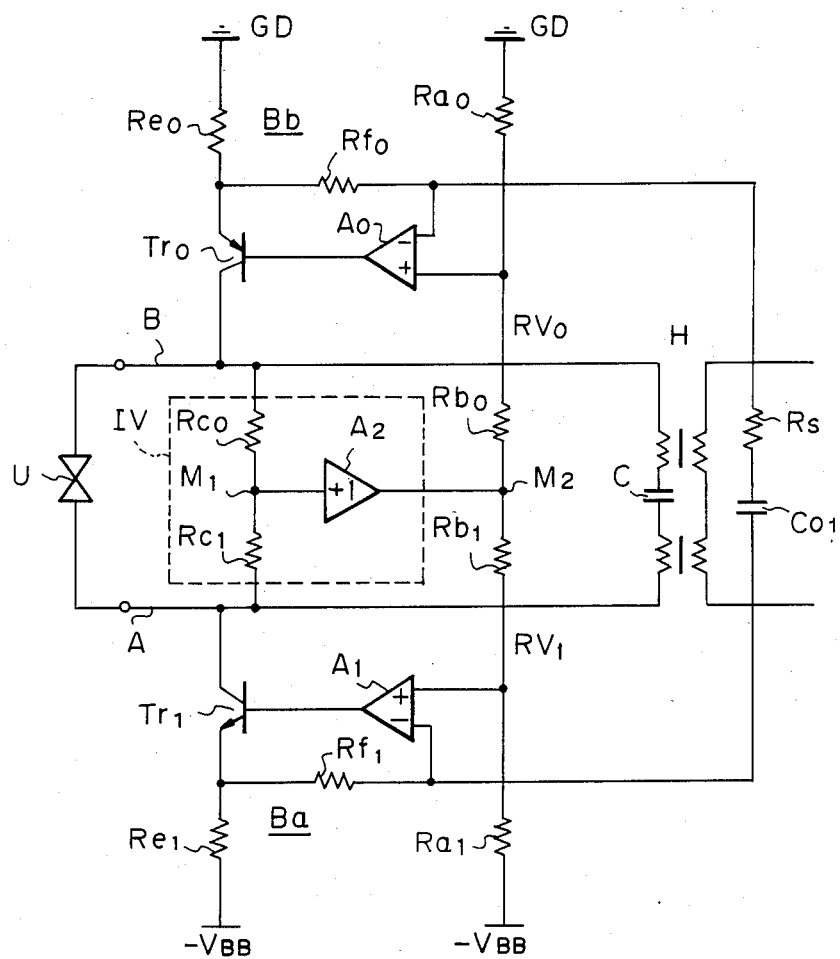
FIG. 12 is a circuit diagram of a battery feed circuit according to the fourth embodiment of the present invention.

FIG. 12 is a circuit diagram of a battery feed circuit according to the fourth embodiment of the present invention. The battery feed circuit of the fourth embodiment is an improved version of the second embodiment and features a reduced number of electrical components.

Figure 13:
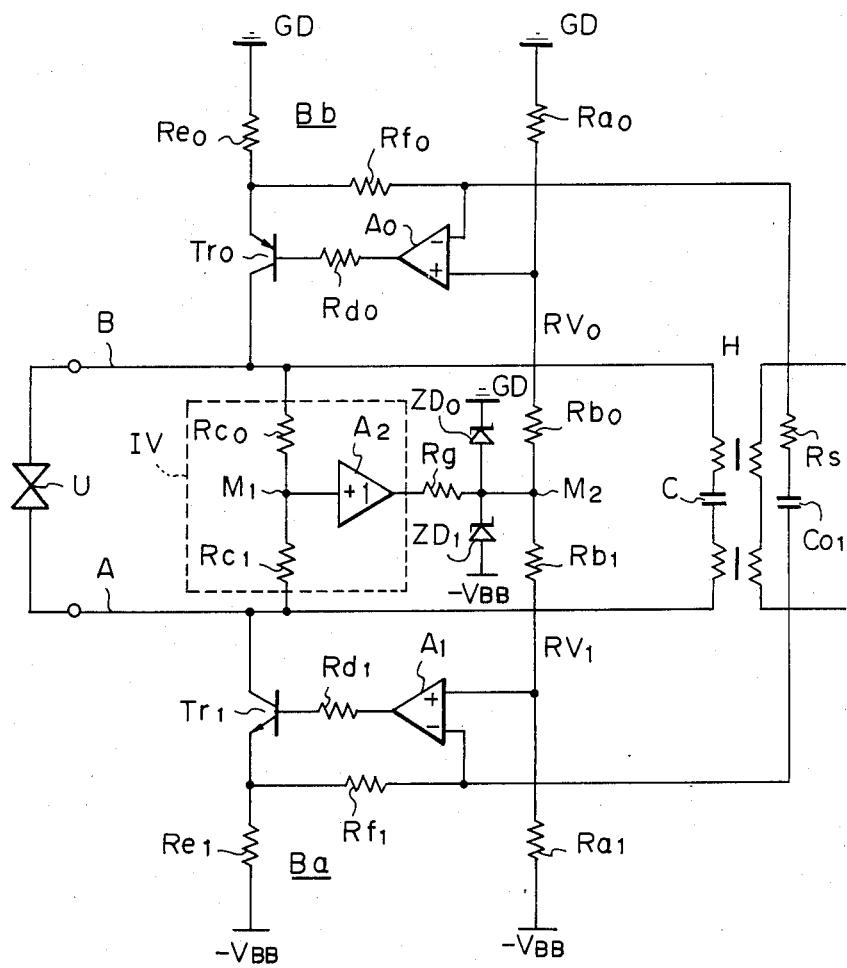
FIG. 13 is a circuit diagram of a battery feed circuit according to a fifth embodiment of the present invention.

FIG. 13 is a circuit diagram of a battery feed circuit according to a fifth embodiment of the present invention. This corresponds to a similar improved version of the third embodiment.

Figure 14:
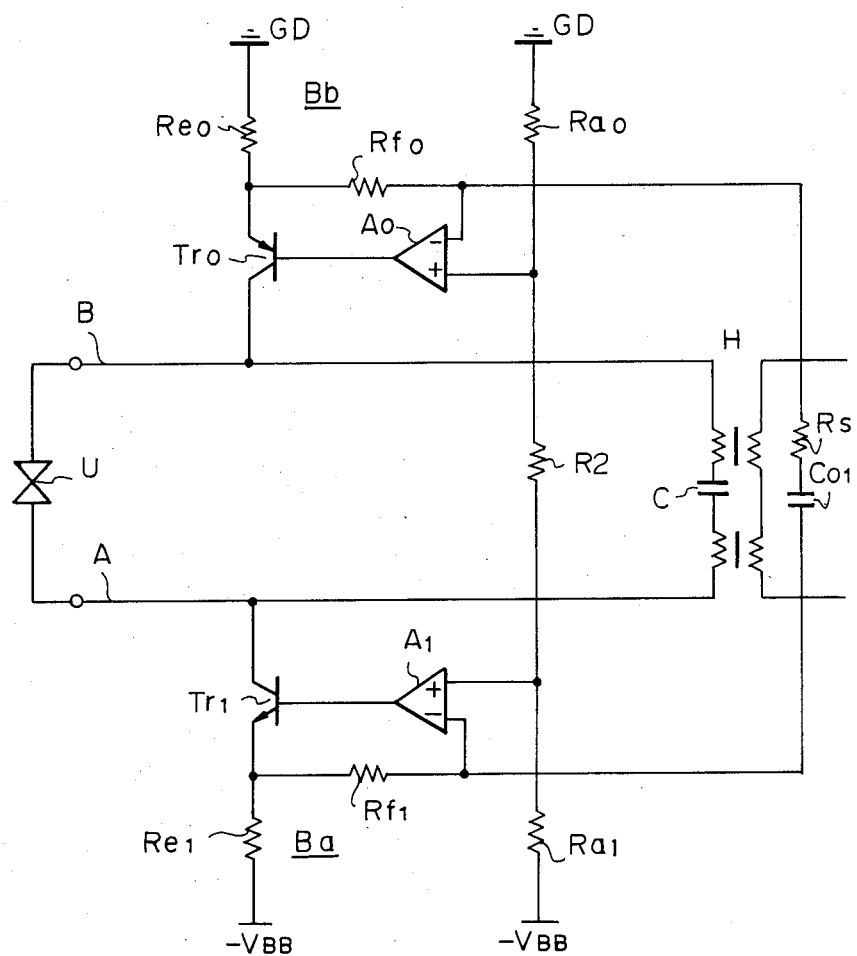
FIG. 14 is a circuit diagram of a battery feed circuit according to a sixth embodiment of the present invention.

FIG. 14 is a circuit diagram of a battery feed circuit according to a sixth embodiment of the present invention. The battery feed circuit of the sixth embodiment excludes the intermediate voltage output circuit IV and its neighboring members. If the switching system is not expected to suffer from the aforesaid common mode noise but just the aforesaid power source noise, this embodiment is preferable from an economical viewpoint.

As explained above in detail, the battery feed circuit according to the present invention is superior in view of one or more of power consumption, suppression of common mode noise, and suppression of power source noise.

We claim:

1. A battery feed circuit for feeding constant currents from a power source with a power source level to a first subscriber line and a second subscriber line having voltages thereon, comprising:
   first and second feed circuit parts operatively connected to the first and second subscriber lines, respectively;
   first and second reference voltage output circuits, operatively connected to said first and second feed circuit parts and the power source, for producing first and second reference voltages by dividing the ground level and the power source level and for applying the first and second reference voltages to said first and second feed circuit parts, respectively; and
   an intermediate voltage output circuit, operatively connected to said first and second feed circuit parts and said first and second reference voltage output circuits, for producing an intermediate voltage between the voltages on the first and second subscriber lines and for supplying the intermediate voltage to each of said first and second reference voltage output circuits simultaneously.

2. A battery feed circuit as set forth in claim 1, wherein
   said intermediate voltage output circuit has an output terminal,
   said first reference voltage output circuit comprises first and second resistors connected in series between ground and the output terminal of said intermediate voltage output circuit, and
   said second reference voltage output circuit comprises third and fourth resistors connected in series between the output terminal of said intermediate output voltage circuit and the power source.

3. A battery feed circuit as set forth in claim 2, wherein said intermediate voltage output circuit comprises:
   a fifth resistor and a sixth resistor, connected in series between the first and second subscriber lines with a first intermediate connecting point therebetween; and
   an amplifier having an input operatively connected to the intermediate connecting point of the second and third resistors and having an output operatively connected to the output terminal of said intermediate voltage output circuit.

4. A battery feed circuit as set forth in claim 3, wherein
   said first feed circuit part comprises:
      a seventh resistor having a first end operatively connected to ground and having a second end;
      a first operational amplifier having an input terminal operatively connected to said first reference voltage output circuit to receive the first reference voltage, a second input terminal, operatively connected to the second end of said seventh resistor, and an output terminal; and
      a first transistor, having a base operatively connected to the output terminal of said first operational amplifier, operatively connected between said seventh resistor and said first subscriber line, and
   said second feed circuit part comprises:
      an eighth resistor having a first end operatively connected to the power source and having a second end;
      a second operational amplifier having a first input terminal operatively connected to said first reference voltage output circuit to receive the second reference voltage, a second input terminal, operatively connected to the second end of said eighth resistor, and an output terminal;
      a second transistor, having a base operatively connected to the output terminal of said second operational amplifier, operatively connected between said eighth resistor and said second subscriber line.

5. A battery feed circuit as set forth in claim 4, wherein
   the second input terminal of said first operational amplifier is directly connected to a second intermediate connecting point between said seventh resistor and said first transistor, and
   the second input terminal of said second operational amplifier is directly connected to a third intermediate connecting point between said eighth resistor and said second transistor.

6. A battery feed circuit as set forth in claim 4, wherein
   said first feed circuit part further comprises:
      a ninth resistor operatively connected to the second end of said seventh resistor and the second input terminal of said first operational amplifier;
      a tenth resistor having a first end operatively connected to the second input terminal of said first operational amplifier and a second end; and
      a first capacitor operatively connected between the second end of said tenth resistor and the power source, and
   said second feed circuit part further comprises:
      an eleventh resistor operatively connected to the second end of said eighth resistor and the second input terminal of said second operational amplifier;
      a twelfth resistor having a first end operatively connected to the second input terminal of said second operational amplifier and a second end; and
      a second capacitor operatively connected between the second end of said twelfth resistor and ground.

7. A battery feed circuit as set forth in claim 6, wherein
   said first feed circuit part further comprises a thirteenth resistor operatively connected between the base of said first transistor and the output terminal of said first operational amplifier, and
   said second feed circuit part further comprises a fourteenth resistor operatively connected between the base of said second transistor and the output terminal of said second operational amplifier.

8. A battery feed circuit as set forth in claim 7, wherein
   said second and third resistors have an intermediate connecting point therebetween, and
   said intermediate voltage output circuit further comprises:
      first and second zener diodes, operatively connected in series between ground and the power source, having an intermediate connecting point therebetween; and
      a fifteenth resistor having a first end operatively connected to the intermediate connecting point between said first and second zener diodes and a second end operatively connected to the output of said amplifier, the first end of said fifteenth resistor also operatively connected to the intermediate connecting point between said second and third resistors.

9. A battery feed circuit as set forth in claim 3, wherein said amplifier is a voltage follower.

10. A battery feed circuit as set forth in claim 9, wherein said voltage follower has a gain of 1.

11. A battery feed circuit as set forth in claim 4, wherein
    said first and second feed circuit parts further comprise ninth and tenth resistors operatively connected between the second end of said seventh and eighth resistors and the second input terminals of said first and second operational amplifiers, respectively, and
    said battery feed circuit further comprises an eleventh resistor and a capacitor operatively connected in series between the second input terminals of said first and second operational amplifiers.

12. A battery feed circuit for a subscriber line pair, feeding constant currents from a power source to a first subscriber line and a second subscriber line, said battery feed circuit comprising:
    a first operational amplifier having first and second input terminals and an output terminal;
    a first transistor having a control terminal operatively connected to the output terminal of said first operational amplifier, a first terminal operatively connected to the first subscriber line and a second terminal;
    a second operational amplifier having first and second input terminals and an output terminal;
    a second transistor having a control terminal operatively connected to the output terminal of said second operational amplifier, a first terminal operatively connected to the second subscriber line and a second terminal;
    first, second and third resistors operatively connected in series between ground and the power source, forming a first intermediate connecting point between said first and second resistors and a second intermediate connecting point between said second and third resistors, the first and second intermediate connecting points operatively connected to the first input terminals of said first and second operational amplifiers, respectively;
    fourth and fifth resistors each having first ends, operatively connected to ground and the power source, respectively, and second ends, operatively connected to the second terminals of said first and second transistors, respectively; sixth resistor operatively connected between the second input terminal of said first operational amplifier and the second terminal of said first transistor;
    a seventh resistor operatively connected between the second input terminal of said second operational amplifier and the second terminal of said second transistor;
    an eighth resistor and a DC-cut capacitor operatively connected in series between the second input terminals of said first and second operational amplifiers.

13. A battery feed circuit as set forth in claim 11, wherein
    said first feed circuit part further comprises an eleventh resistor operatively connected between the base of said first transistor and the output terminal of said first operational amplifier, and
    said second feed circuit part further comprises a twelfth resistor operatively connected between the base of said second transistor and the output terminal of said second operational amplifier.

14. A battery feed circuit as set forth in claim 13, wherein
    said second and third resistors have an intermediate connecting point therebetween, and
    said intermediate voltage output circuit further comprises:
        first and second zener diodes, operatively connected in series between ground and the power source, having an intermediate connecting point therebetween; and
        a fifteenth resistor having a first end operatively connected to the output of said amplifier and a second end operatively connected to the intermediate connecting point between said first and second zener diodes and the intermediate connecting point between said second and third resistors.

* * * * *